United States Patent
Wu et al.

(10) Patent No.: US 11,402,533 B2
(45) Date of Patent: Aug. 2, 2022

(54) RANGING AND RESISTIVITY EVALUATION USING CURRENT SIGNALS

(71) Applicant: HALLIBURTON ENERGY SERVICES, INC., Houston, TX (US)

(72) Inventors: Hsu-Hsiang Wu, Sugar Land, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 372 days.

(21) Appl. No.: 15/754,549

(22) PCT Filed: May 6, 2016

(86) PCT No.: PCT/US2016/031219
§ 371 (c)(1),
(2) Date: Feb. 22, 2018

(87) PCT Pub. No.: WO2017/192148
PCT Pub. Date: Nov. 9, 2017

(65) Prior Publication Data
US 2018/0239043 A1    Aug. 23, 2018

(51) Int. Cl.
*G01V 11/00* (2006.01)
*G01V 3/12* (2006.01)
(Continued)

(52) U.S. Cl.
CPC .......... *G01V 3/08* (2013.01); *G01V 3/12* (2013.01); *G01V 3/22* (2013.01); *G01V 3/24* (2013.01); *G01V 11/002* (2013.01)

(58) Field of Classification Search
CPC ... G01V 3/08; G01V 3/28; G01V 3/38; G01V 3/20; G01V 3/30; E21B 47/00; E21B 44/00; E21B 49/003
(Continued)

(56) References Cited

U.S. PATENT DOCUMENTS

| 5,321,893 A | 6/1994 | Engebretson |
| 5,751,895 A * | 5/1998 | Bridges ................. E21B 36/04 392/306 |

(Continued)

FOREIGN PATENT DOCUMENTS

| WO | 2000067047 A1 | 11/2000 |
| WO | 2016025230 A1 | 2/2016 |

(Continued)

OTHER PUBLICATIONS

Working with the Magic of Electromagnetics, Weatherford, reprinted from Oilfield Technology, Mar. 2014.
(Continued)

*Primary Examiner* — Jeffrey P Aiello
(74) *Attorney, Agent, or Firm* — Benjamin Ford; C. Tumey Law Group PLLC

(57) ABSTRACT

Methods, systems, and computer program products use current leakage rates to evaluate the resistivity of a subterranean formation around a drilling well in conjunction with a ranging operation. The evaluation entails obtaining a current distribution along a section of the drilling well as part of a ranging measurement. The current distribution allows the current leakage rate to be determined along that section of the drilling well. Multiple current leakage rates may then be determined along the drilling well to produce a leakage rate curve that may be matched with modeled or known leakage rate curves to estimate the formation resistivity around the drilling well. Formation resistivity may also be calculated from the current distribution using an appropriate equation. The ability to obtain a current distribution along a section of the drilling well as part of a ranging measurement allows formation resistivity to be evaluated in conjunction with ranging operations.

27 Claims, 9 Drawing Sheets

(51) Int. Cl.
  *G01V 3/22* (2006.01)
  *G01V 3/08* (2006.01)
  *G01V 3/24* (2006.01)
(58) Field of Classification Search
  USPC .............. 73/152.28; 166/250.01; 175/24, 40; 324/303, 339; 702/7–9, 11
  See application file for complete search history.

(56) References Cited

U.S. PATENT DOCUMENTS

| | | | | |
|---|---|---|---|---|
| 6,064,210 | A * | 5/2000 | Sinclair | G01V 3/20 324/338 |
| 6,157,195 | A | 12/2000 | Vail, III | |
| 6,680,613 | B2 * | 1/2004 | Rosthal | G01V 3/28 324/339 |
| 7,059,428 | B2 * | 6/2006 | Frey | G01V 3/30 175/50 |
| 7,388,382 | B2 | 6/2008 | Strack et al. | |
| 2001/0026156 | A1 | 10/2001 | Dubourg et al. | |
| 2009/0030615 | A1 * | 1/2009 | Clark | E21B 47/02216 702/7 |
| 2010/0114492 | A1 * | 5/2010 | Zhao | G01V 3/24 702/7 |
| 2013/0319659 | A1 * | 12/2013 | Freedman | E21B 47/02 166/250.01 |
| 2014/0132271 | A1 * | 5/2014 | Liu | G01V 3/20 324/338 |
| 2015/0083409 | A1 * | 3/2015 | Hay | E21B 44/005 166/254.1 |
| 2016/0230544 | A1 * | 8/2016 | Han | E21B 47/122 |
| 2017/0212269 | A1 * | 7/2017 | Itskovich | G01V 3/26 |

FOREIGN PATENT DOCUMENTS

| | | |
|---|---|---|
| WO | 2016025247 A1 | 2/2016 |
| WO | 2017030575 A1 | 2/2017 |
| WO | 2017188921 A1 | 11/2017 |

OTHER PUBLICATIONS

Kim, PCT Search Report for PCT Application No. PCT/US2016/031219 dated Feb. 1, 2017.
Kim, PCT Written Opinion for PCT Application No. PCT/US2016/031219 dated Feb. 1, 2017.

* cited by examiner

RANGING AND RESISTIVITY EVALUATION USING CURRENT SIGNALS

TECHNICAL FIELD

The exemplary embodiments disclosed herein relate generally to systems and method for determining the resistivity of a subterranean formation around a well using current signals. In particular, the embodiments disclosed herein relate to evaluating formation resistivity by obtaining a current distribution along a section of the well in conjunction with a ranging operation.

BACKGROUND

Formation properties like resistivity are used in the oil and gas industry to assess the likelihood that hydrocarbon may be present in a subterranean formation. One method of determining the resistivity of a formation involves the use of electromagnetic logging tools. The logging tools use transmitter antennas that transmit electromagnetic waves into the formation and receiver antennas that subsequently receive the electromagnetic waves from the formation. The received electromagnetic waves are then processed to obtain measurements of the formation resistivity. This technique is generally known in the resistivity logging art.

Formation resistivity may also be determined in conjunction with making magnetic ranging measurements between an existing well (target well) and a well that is being drilled (drilling well). Such ranging measurements are useful, for example, in steam-assisted gravity drainage (SAGD) where the distance between two vertically-spaced, horizontal wells needs to be carefully controlled. The ranging measurements use a low frequency (e.g., 5 Hz) or sometimes DC current provided along the casing of the target well to induce a magnetic field that may then be detected by sensors along the drilling well to determine the distance between the two wells.

These same ranging measurements may also be used to derive the rate at which the current in the casing of the target well leaks into the surrounding formation. The current leakage rate (amperes/meter) has been found to be linked to several important parameters, including formation resistivity, pipe conductivity, mud resistivity, and cement resistivity. As the latter three properties are usually known for a given well, finding the current leakage rate allows the formation resistivity to be determined.

Other techniques for determining formation resistivity are also available and each has its advantages. Nevertheless, a need exists for an improved way to determine the resistivity and other properties of a formation.

BRIEF DESCRIPTION OF THE DRAWINGS

For a more complete understanding of the exemplary disclosed embodiments, and for further advantages thereof, reference is now made to the following description taken in conjunction with the accompanying drawings in which.

DESCRIPTION OF EXEMPLARY EMBODIMENTS

The following discussion is presented to enable a person skilled in the art to make and use the exemplary disclosed embodiments. Various modifications will be readily apparent to those skilled in the art, and the general principles described herein may be applied to embodiments and applications other than those detailed below without departing from the spirit and scope of the disclosed embodiments as defined herein. Accordingly, the disclosed embodiments are not intended to be limited to the particular embodiments shown, but are to be accorded the widest scope consistent with the principles and features disclosed herein.

The embodiments disclosed herein relate to improved methods and systems for evaluating the resistivity of a subterranean formation around a drilling well using current signals. The disclosed methods and systems advantageously measure current signals along a section of the drilling well in conjunction with making ranging measurements. This may entail obtaining current signal measurements for the resistivity evaluation at substantially the same time as the ranging measurements and using the same excitation source. Indeed, as alluded to earlier, the ranging measurements themselves may also be used as the current signal measurements for the resistivity evaluation in some embodiments. From the current signal measurements, a current distribution may be determined along the section of the drilling well that may then be used to calculate the formation resistivity. The current distribution may also be used to determine a current leakage rate along the section of the drilling well that may then be used to determine the formation resistivity. In either case, the ability to obtain a current distribution along a section of the drilling well in conjunction with a ranging operation allows formation resistivity evaluations to be performed substantially at the same time as ranging operations. Such resistivity evaluations may be performed as part of a logging/measurement while drilling (L/MWD) operation, wireline operation, slickline operation, and similar operations.

Figure 1:
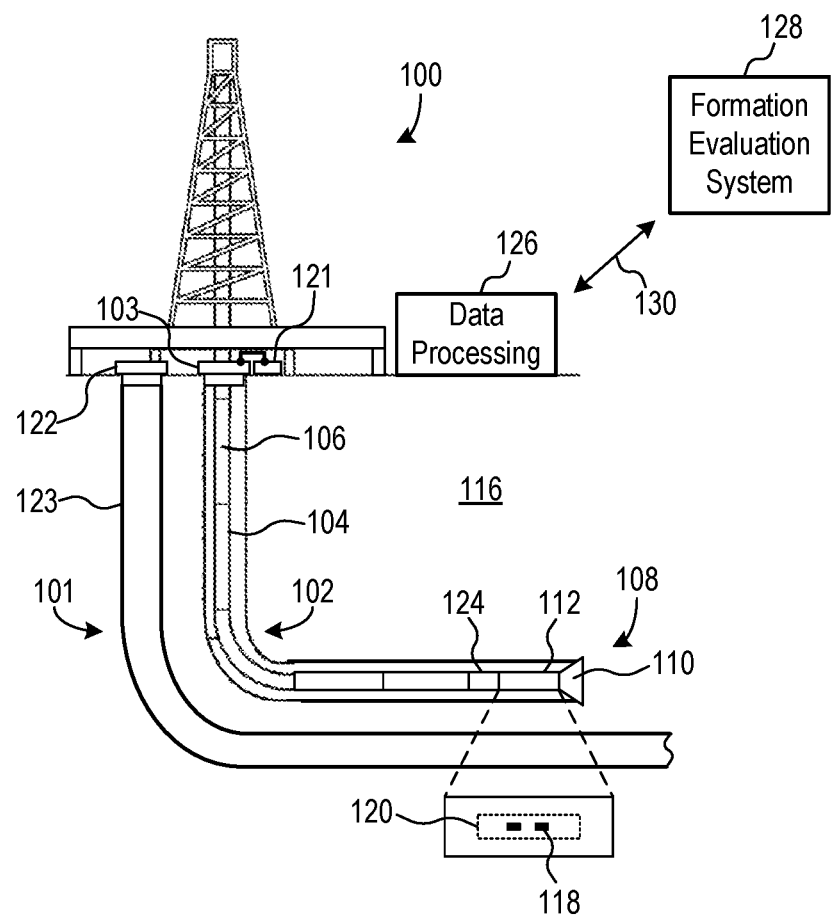
FIG. 1 illustrates an exemplary well in which a formation resistivity evaluation tool may be used according to the disclosed embodiments.

Referring now to FIG. 1, a ranging operation 100 is shown wherein the methods and systems disclosed herein may be used for evaluating formation resistivity and other properties. The ranging operation 100 primarily involves monitoring the distance between a target well 101 and a second or drilling well 102 being drilled substantially parallel to the target well 101. The drilling well 102 has a wellhead 103 and a drill string 104 suspended therefrom composed of a series of tubulars or pipe segments 106 connected to one another. The drill string 104 includes a bottom hole assembly (BHA) 108 attached at the end thereof that typically has a rotary drill bit 110 connected to a steel drill collar 112 for drilling a wellbore 114 along a specified path in the formation 116. One or more sensors 118 may then be installed or otherwise mounted on the drill collar 112 for detecting or otherwise measuring current along the drill collar 112. The sensors 118 may be discrete sensors or they may be coupled to or otherwise integrated with a downhole tool 120, such as an L/MWD tool or other instrument within the drill collar 112.

In accordance with the disclosed embodiments, the one or more sensors 118 may be the same sensors used for ranging measurements or they may be sensors that are installed specifically to perform formation resistivity evaluations as described herein. The sensors 118 may then be used to measure or otherwise detect either directly or indirectly a low-frequency or sometimes DC current signal or amplitude thereof on the drill collar 112. The current signal may be provided by a power supply 121 via an excitation electrode (not expressly labeled) connected to the wellhead 103 as part of the ranging operation 100. This current signal travels from the wellhead 103 down the drill string 104, along the length of the drill collar 112, and out of the BHA 108 where the current signal eventually returns to the power supply 121 via a return electrode (not expressly shown). The sensors 118 may then be used to measure or detect the current signal or amplitude thereof either as part of a ranging measurement or independently but substantially at the same time as the ranging management.

In some embodiments, detection of the current signal or amplitude thereof may be done magnetically by detecting a magnetic field induced by the current signal. In these embodiments, the sensors 118 may be magnetometers or similar sensors that are capable of detecting a magnetic field. In other embodiments, detection of the current signal or amplitude thereof may be done electrically by detecting a voltage or current induced by the current signal. In these embodiments, the sensors 118 may be current or voltage sensors or similar sensors that are capable of detecting a voltage or current.

In the example of FIG. 1, the one or more sensors 118 are shown as being located on the drill collar 112. In some embodiments, however, the sensors 118 may be located along a different part of the drill string 104, such as one of the tubulars or pipe segments 106, or at other locations on the BHA 108, and the like. In general, the sensors 118 may be mounted on any part of the drill string 104 that is made of a conductive material through which the current signal may travel and leak into the formation 116.

As well, in some embodiments, the power supply 121 need not be coupled to the wellhead 103 of the drilling well 102 to effectuate ranging measurements, but may be coupled to the drill string 104 or directly to the drill collar 112, with the excitation and return electrodes connected as appropriate. Indeed, in these embodiments, the power supply 121 may be located downhole, for example, within the drill collar 112 or other suitable location on the BHA 108. Alternatively, the power supply 121 may be connected to the target well 101, for example, to a wellhead 122 or a casing 123 thereof. And although not shown, it is of course possible to use two power supplies, one power supply at a time, with the first power supply connected to the target well 101 for ranging measurements and the second power supply connected to the drilling well 102 for formation resistivity evaluations.

Continuing with FIG. 1, a telemetry unit 124 may be attached to the sensors 118 and/or downhole tool 120 for transmitting sensor data to a data processing unit 126 located either near the drilling well 100 and/or at another location as needed. Any suitable telemetry unit 124 may be used to transmit the sensor data from the sensors 118 and/or downhole tool 120 to the data processing unit 126, including a mud pulse telemetry unit, acoustic telemetry unit, electromagnetic telemetry unit, as well as wiring on the drill string 104, and the like. It is also possible to locate the data processing unit 126 downhole on the drill string 104, for example, in the drill collar 112 or other suitable location on the BHA 108 for in-situ processing of the sensor data from the sensors 118. Alternatively, a portion of the data processing unit 126 may be located downhole and a portion located on the surface as needed to optimize processing of the sensor data. The data processing unit 126 thereafter stores and/or processes the sensor data (e.g., filtering, analog-to-digital conversion, etc.) as needed and sends the processed sensor data to a formation evaluation system 128 via a communication link 130.

In some embodiments where the sensors 118 are used mainly for formation resistivity evaluations, the sensor data received by the formation evaluation system 128 need not be processed for much more than the current signal or amplitude thereof. In some embodiments where the sensors 118 are used both for ranging measurements and resistivity evaluations, the sensor data received by the formation evaluation system 128 may be processed for other data in addition to the current signal, such as sensor orientation and the like. The current signal may then be derived or decoupled from the ranging measurement data and thereafter used by the formation evaluation system 128 to perform formation resistivity evaluations. As with the data processing unit 126, the formation evaluation system 128 may also be located downhole on the drill string 104, such as in the drill collar 112 or other suitable location on the BHA 108 in some embodiments. In other embodiments, a portion of the formation evaluation system 128 may be located downhole and a portion located on the surface as needed.

Figure 2:
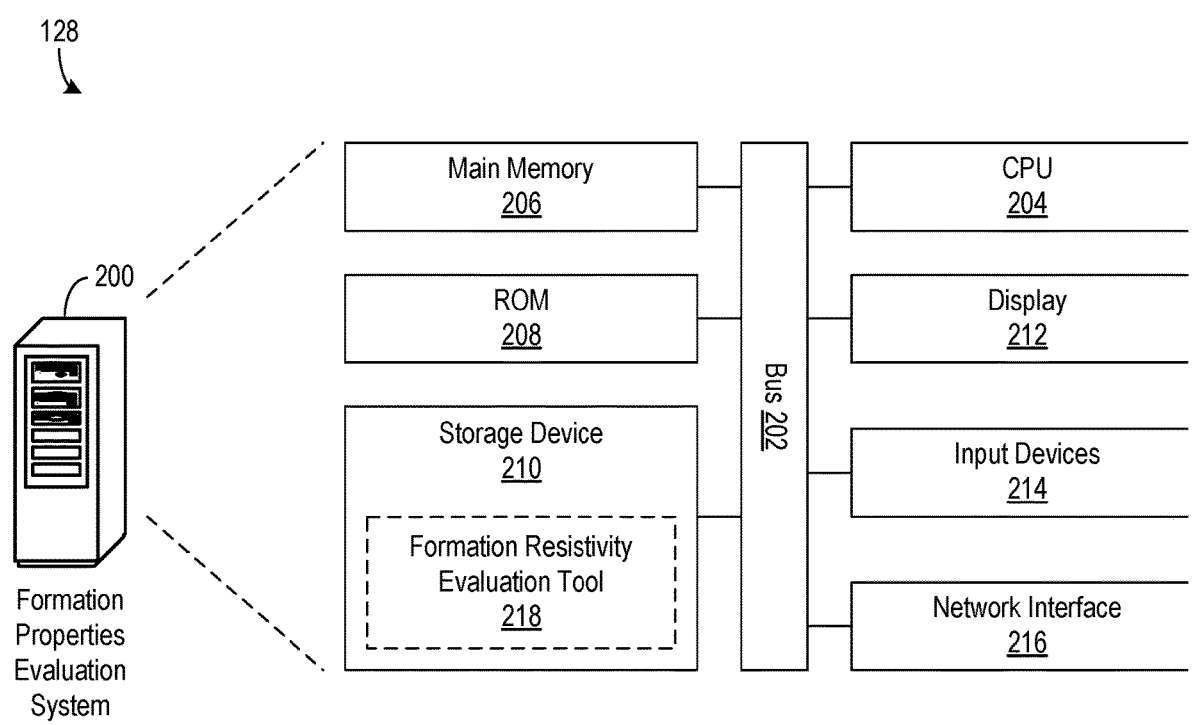
FIG. 2 illustrates an exemplary system that may be used to run the formation resistivity evaluation tool according to the disclosed embodiments.

FIG. 2 illustrates an exemplary implementation of the formation evaluation system 128 according to the embodiments disclosed herein. The formation evaluation system 128, which is depicted as a surface level system here for ease of reference only, may include a conventional computing system, such as a workstation, desktop, or laptop computer, indicated at 200, or it may include a custom computing system developed for a particular application. In a typical arrangement, the computing system 200 includes a bus 202 or other communication pathway for transferring information among other components within the computing system 200, and a CPU 204 coupled with the bus 202 for processing the information. The computing system 200 may also include a main memory 206, such as a random access memory (RAM) or other dynamic storage device coupled to the bus 202 for storing computer-readable instructions to be executed by the CPU 204. The main memory 206 may also be used for storing temporary variables or other intermediate information during execution of the instructions by the CPU 204.

The computing system 200 may further include a read-only memory (ROM) 208 or other static storage device coupled to the bus 202 for storing static information and instructions for the CPU 204. A computer-readable storage device 210, such as a nonvolatile memory (e.g., Flash memory) drive or magnetic disk, may be coupled to the bus 202 for storing information and instructions for the CPU 204. The CPU 204 may also be coupled via the bus 202 to a display 212 for displaying information to a user. One or more input devices 214, including alphanumeric and other keyboards, mouse, trackball, cursor direction keys, and so forth, may be coupled to the bus 202 for transferring information and command selections to the CPU 204. A communications interface 216 may be provided for allowing the computing system 200 to communicate with an external system or network.

The term "computer-readable instructions" as used above refers to any instructions that may be performed by the CPU 204 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 210. Volatile media may include dynamic memory, such as main memory 206. Transmission media may include coaxial cables, copper wire and fiber optics, including the wires of the bus 202. Transmission itself may take the form of electromagnetic, acoustic or light waves, such as those generated for radio frequency (RF) and infrared (IR) data communications. Common forms of computer-readable media may include, for example, magnetic medium, optical medium, memory chip, and any other medium from which a computer can read.

In accordance with the disclosed embodiments, a formation resistivity evaluation tool 218, or the computer-readable instructions therefor, may also reside on or be downloaded to the storage device 210 for execution. The formation resistivity evaluation tool 218 may be a standalone tool or it may be part of a larger suite of tools that may be used to obtain an overall evaluation of the formation 116. Such an evaluation tool 218 may be implemented in any suitable computer programming language or software development package known to those having ordinary skill in the art, including various versions of C, C++, FORTRAN, and the like. Users may then use the evaluation tool 218 to obtain a current distribution at various depths along the drilling well 102 to more accurately characterize formation resistivity.

Figure 3:
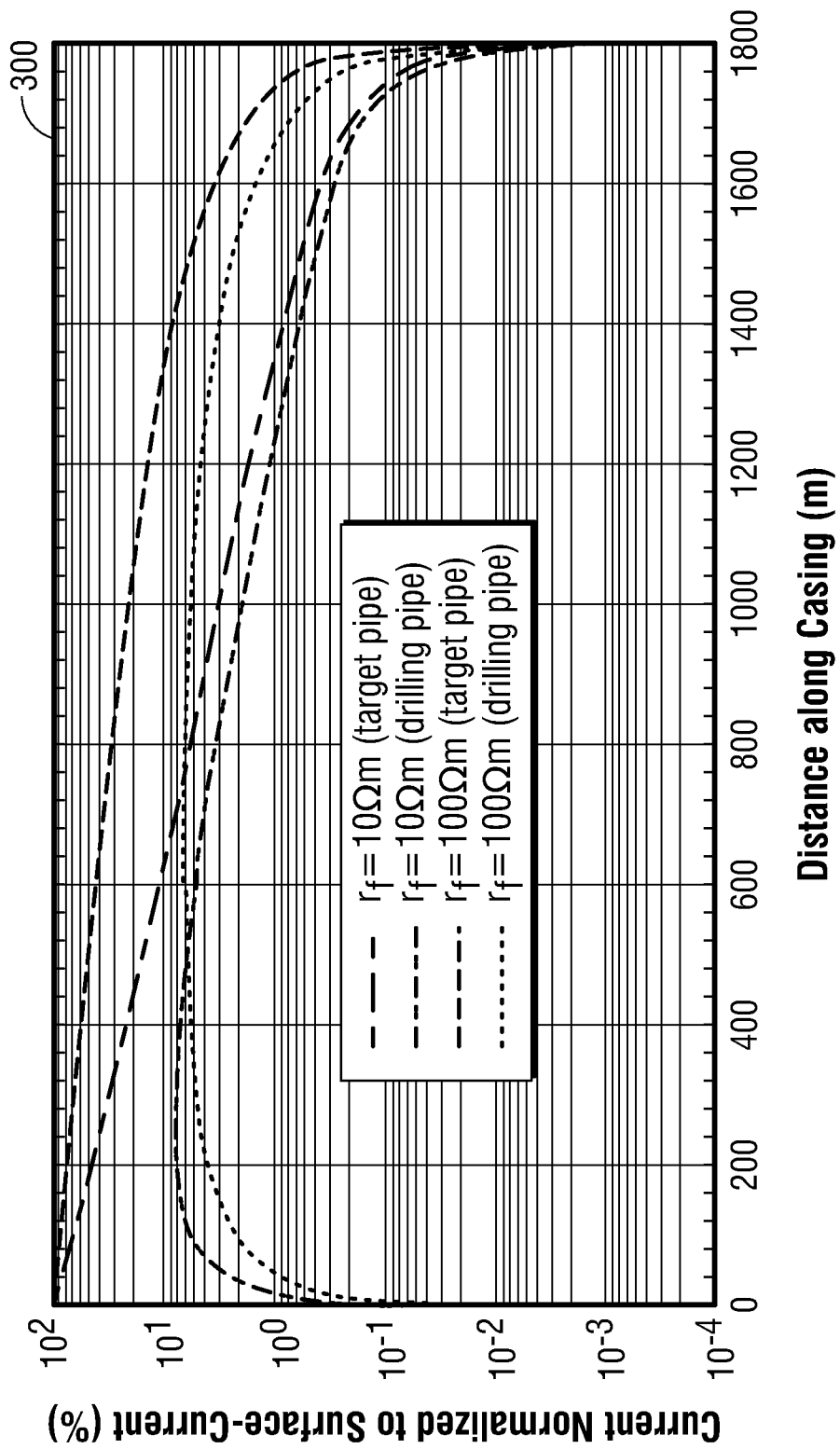
FIG. 3 illustrates exemplary current distribution curves according to the disclosed embodiments.

Operation of the formation resistivity evaluation tool 218 is explained with reference to FIG. 3 in which a plot 300 shows exemplary current distribution curves for an exemplary target well and drilling well. The various current distribution curves were derived through modeling of wells roughly 1800 meters in length and using pipe segments having a conductivity of about $10^6$ S/m (Siemens/meter) to represent conductive portions of the wells. In the plot 300 of FIG. 3, the horizontal axis is measured depth (MD) of the well casing, the vertical axis represents percentage values, and each curve represents the current distribution along the wells for different formation resistivity, as normalized to a 5 Hz current signal. Solid line curves represent the well casing and dashed line curves represent the drill string.

From the current distributions, a current leakage rate may be determined by calculating a slope for the current distributions. In some embodiments, the slope may be calculated using Equation (1):

$$\text{Slope} = \log 10\left(\frac{\log 10(I(i)) - \log 10(I(i-1))}{MD(i) - MD(i-1)}\right) \quad (1)$$

where i represents a depth index along the drill string, I(i) is the amplitude of the current signal as measured or detected at the depth index i, MD(i) represents measured depth at the depth index i, and so on. When the slope in Equation (1) is calculated from measurements made using the sensors 118, the depth index i may represent the measured depth at which the measurement was obtained. Thus, depth index i corresponds to the measured depth at which one measurement was obtained while depth index i−1 corresponds to the measured depth at which a previous measurement was obtained.

In general, at shallow depths (i.e., from 0 to 1000 m), the leakage rates (slopes) are relatively flat and uniquely distinguishable for a particular formation resistivity. At depths between 1000 m and 1600 m, the leakage rates are still distinguishable for low resistivity formations (e.g., less than 50Ω·m), but become increasingly less distinguishable for high resistivity formations. After 1600 m, the leakage rates begin merging with one another due to well-known "end of pipe" effects where the current signal along a well becomes very small when approaching the end of the well. An additional factor is the low frequency of the current signal causes the sensitivity of the current leakage rates to drop as formation resistivity increases.

With the foregoing observations, operation of the formation resistivity evaluation tool 218 may be generally described as follows. The formation resistivity evaluation tool 218 may operate (or be operated) to obtain a current distribution along a section of the drilling well 102 using the drill collar 112 or other conductive components of the BHA 108, or a segment of the drill string 104, and the like. The formation resistivity evaluation tool 218 may then operate (or be operated) to use such current distribution to determine a current leakage rate. The formation resistivity evaluation tool 218 may thereafter operate (or be operated) to determine multiple current leakage rates as the drill collar 112 moves along the wellbore 114, thereby generating a leakage rate curve for the drilling well 102. The leakage rate curve may then be matched to modeled or known leakage rate curves to estimate the formation resistivity surrounding the wellbore 114 of the drilling well 102 in a manner known to those having ordinary skill in the art.

In some embodiments, rather than (or in addition to) curve matching, the formation resistivity evaluation tool 218 may calculate the formation resistivity directly from the current distribution along the drill collar 112. Assuming a relatively homogeneous formation and no "end of pipe" or similar effects, then the formation resistivity may be calculated as shown in Equation (2):

$$Rf = \frac{Rpipe}{\left(\frac{\log\left(\frac{I(z1)}{I(z2)}\right)}{z1 - z2}\right)^2} \quad (2)$$

where Rf is the formation resistivity, Rpipe is the resistance per unit length of the drill collar 112, z1 is a first depth, I(z1) is the current signal amplitude at that depth in the drilling well 114, z2 is a second depth, and I(z2) is the current signal amplitude at the second depth. Rpipe is usually known, but may also be estimated, for example, based on pipe conductivity, pipe permeability, pipe dimension, mud conductivity, and current signal frequency if needed to improve the accuracy of the resistivity calculation. The formation resistivity value Rf may then be calculated for a section of the drilling well 102 between the measured depths z1 and z2. Multiple formation resistivity values Rf may then be calculated at various measured depths as the drill collar 112 moves along the wellbore 114 to obtain the resistivity of the formation 116.

In Equation (2), the first and second measured depths z1 and z2 may correspond to measurements from different sensors 118 obtained at the same time or from the same sensors 118 obtained at different times. For example, z1 may be the depth of a first measurement from one sensor 118 obtained at a given time and z2 may be the depth of a second measurement from another sensor 118 obtained at the same time. Alternatively, z1 may be the depth of a first measurement from a sensor 118 at a given time and z2 may be the depth of a second measurement from the same sensor 118 at a different time.

Additionally, while Equation (2) provides a good approximation in certain circumstances where only current leaking out from the drill collar 112 into the formation 116 is considered, in real-world ranging operations, current flows both into and out of the drilling well 102 as well as into and out of the target well 101. Thus, more advanced techniques for calculating formation resistivity besides Equation (2) may be needed in some cases and those having ordinary skill in the art will understand such techniques fall within the scope of the disclosed embodiments.

Figure 4:
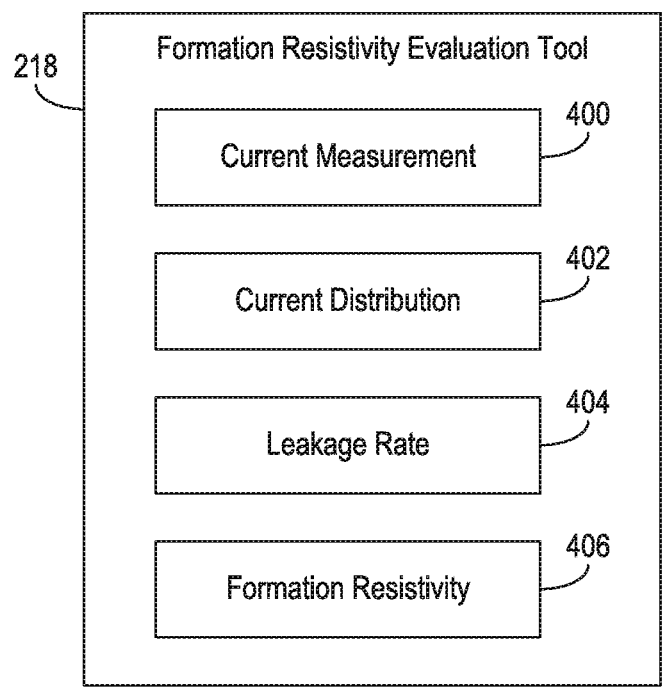
FIG. 4 illustrates an exemplary formation resistivity evaluation tool according to the disclosed embodiments.

An exemplary implementation of the formation resistivity evaluation tool 218 is depicted in FIG. 4. As FIG. 4 shows, the tool 218 has a number of functional components, including a current measurement component 400, a current distribution component 402, a leakage rate component 404, and a formation resistivity component 406. Note that although the various components 400-406 are depicted here as discrete blocks, it should be understood that any block may be divided into two or more constituent blocks and that two or more blocks may be combined to form a single block without departing from the scope of the exemplary disclosed embodiments.

In general operation, the current measurement component 400 is primarily tasked with converting sensor data from the sensors 118 obtained at two or more measured depths into current signal amplitudes. Such sensor data may be obtained as part of a ranging operation involving the sensors 118 and the current measurement component 400 may need to decouple or otherwise separate the current signal amplitudes from other data. Alternatively, such sensor data may be obtained independently either at the same time as the ranging operation or at a different time via the sensors 118. As well, the sensor data may be received directly from the data processing unit 126 either in near real time or after a delay, or the data may be downloaded separately to the formation resistivity evaluation tool 218 from an alternative source (e.g., database).

In some embodiments, the sensor data may represent a detected magnetic field and the current measurement component 400 may convert the magnetic field to a current signal amplitude using any known equation that relates the two parameters. The sensor data may also represent a detected voltage and the current measurement component 400 may convert the voltage to a current signal amplitude using any known equation that relates these parameters. Or the sensor data may represent a detected current signal amplitude, in which case no conversion is needed.

The current distribution component 402 mainly compiles the current signal amplitudes from the current measurement component 400 to produce a current distribution along a section of the well 112 between the two or more measured depths. An exemplary current distribution is provided below in Table 1. As can be seen, the current signal amplitudes in Table 1 were each obtained at a given measured depth and changed at a different measured depth as the sensors 118 are moved along the wellbore 114. Where multiple measurements of a current signal amplitude are obtained at the same measured depth by the same sensor 118, the current distribution component 402 may sum the measurements or take a weighted average thereof or otherwise constructively (and not destructively) combine the measurements as needed.

TABLE 1

| Sensor Location | Current Amplitude (mA) |
| --- | --- |
| ... | ... |
| Z1 | 0.030 |
| Z2 | 0.029 |
| Z3 | 0.028 |
| ... | ... |

As for the leakage rate component 404, this component uses the current distributions obtained by the current distribution component 402 along the section of the well 102 between the two or more measured depths to determine a current leakage rate. In some embodiments, the leakage rate component 404 may determine the current leakage rate using Equation (1) above, although other techniques for determining a current leakage rate from the current distributions may certainly be used without departing from the scope of the disclosed embodiments. Exemplary current leakage rates are provided below in Table 2:

TABLE 2

| Sensor Location | Current Amplitude (mA) | Leakage Rate (mA/m) |
| --- | --- | --- |
| ... | ... | ... |
| Z1 | 0.030 | 0.001 |
| Z2 | 0.029 | 0.001 |
| Z3 | 0.028 | 0.001 |
| ... | ... | ... |

Several such leakage rates may then be determined at various measured depths as the drill collar 112 moves along the wellbore 114 to generate a leakage rate curve for the drilling well. Thereafter, the formation resistivity component 406 may match the leakage rate curve generated by the leakage rate component 404 to modeled or known leakage rate curves for formations with established resistivity. Any suitable curve matching methodology may be used to perform curve matching for the leakage rate component 404, including manually matching, without departing from the scope of the disclosed embodiments.

Alternatively, in some embodiments, instead of generating a leakage rate curve, the formation resistivity component 406 may calculate the formation resistivity from the current distribution obtained along the drill collar 112. This calculation may be performed with Equation (2) or similar equations using the current distribution along the drill collar 112. Multiple such calculations may then be performed at various measured depths as the drill collar 112 moves along the wellbore 114 to obtain the formation resistivity surrounding the wellbore 114 of the drilling well 102.

Thus, as demonstrated above, the formation resistivity around a drilling well may 102 be determined in conjunction with a ranging operation 100 by obtaining the current distribution along a section of the drilling well 102 using the drill collar 112 or other conductive components of the BHA 108 or the drill string 104. It should be noted that while the drill collar 112 or other components of the BHA 108 may be used in an L/MWD operation, in practice, the drilling well is filled with mud and the resistivity of the mud should also be considered. To improve the accuracy of the calculations discussed above, the resistivity of the mud may be included in the resistivity of the BHA 108. On the other hand, in a wireline or similar operation (not expressly shown), the sensors 118 may be mounted on a housing of the logging tool and the like and mud resistivity need not be considered. In either case, as long as a current signal may be provided along a conductive material and sensors may be mounted on the conductive material to obtain a current distribution along the conductive material, formation resistivity may be determined as described herein.

Figure 5:
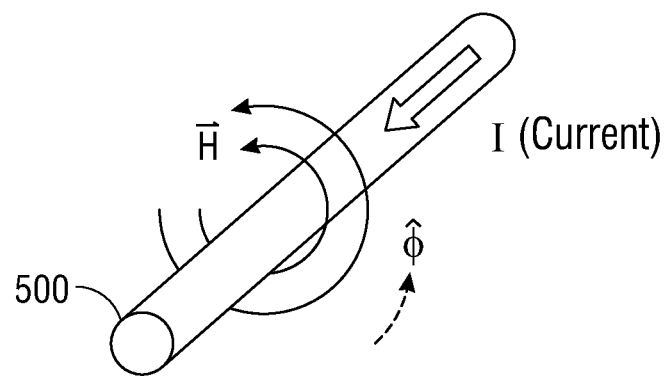
FIG. 5 illustrates a perspective view of an infinite conductor approximating a conductive material according to the disclosed embodiments.

Turning now to FIG. 5, to measure or detect the current signal, whether independently or as part of a ranging operation, the drill collar 112 may be approximated using an infinite line source 500 having a constant (DC) or low-frequency current I therein. Based on Ampere's law, the current I induces a magnetic field H around the line source 500 that may be expressed by Equation (3) below, where r is the distance from the line source 500 to the magnetic field H and $\hat{\Phi}$ is a vector indicating the direction of the magnetic field:

$$\vec{H} = \frac{I}{2\pi r}\hat{\Phi} \qquad (3)$$

Figure 6:
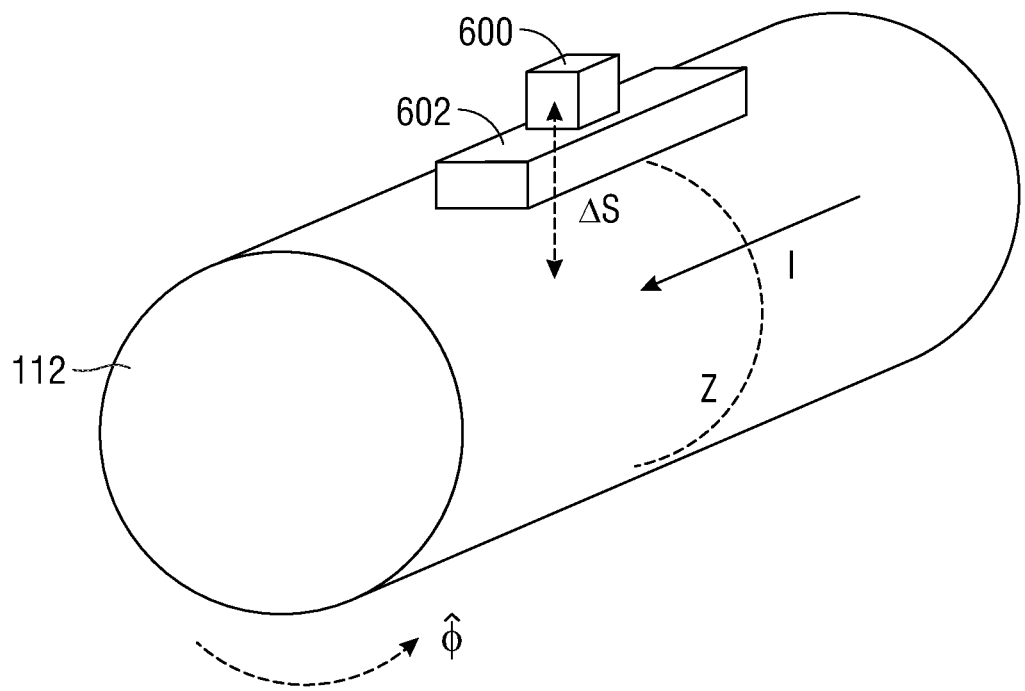
FIG. 6 illustrates an exemplary sensor arrangement for use with the formation resistivity evaluation tool according to the disclosed embodiments.
Figure 7:
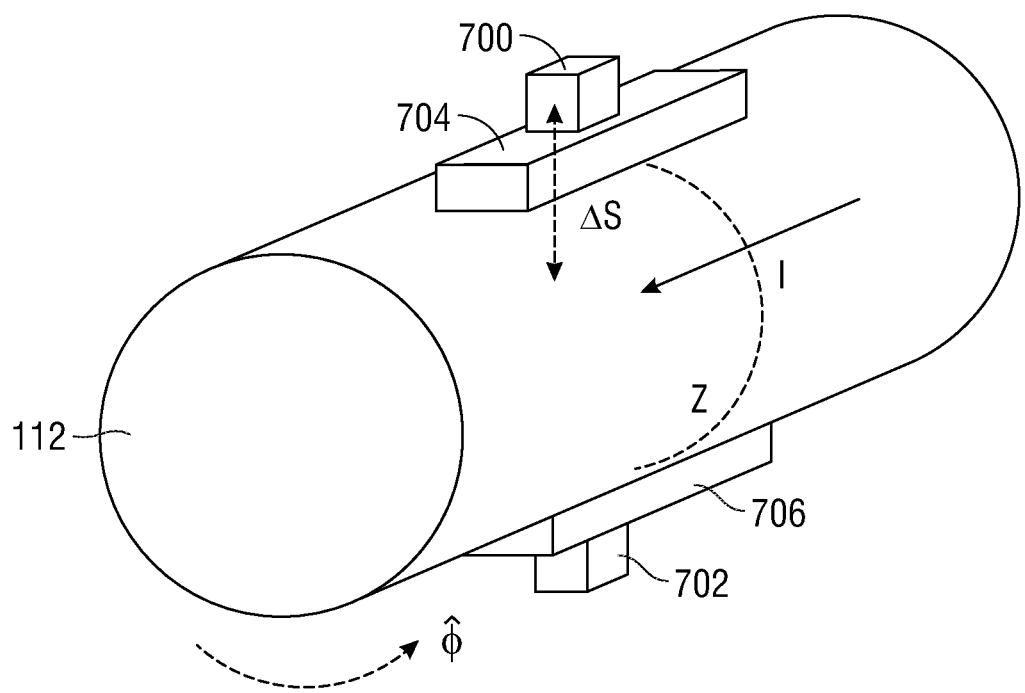
FIG. 7 illustrates another exemplary sensor arrangement for use with the formation resistivity evaluation tool according to the disclosed embodiments.
Figure 8:
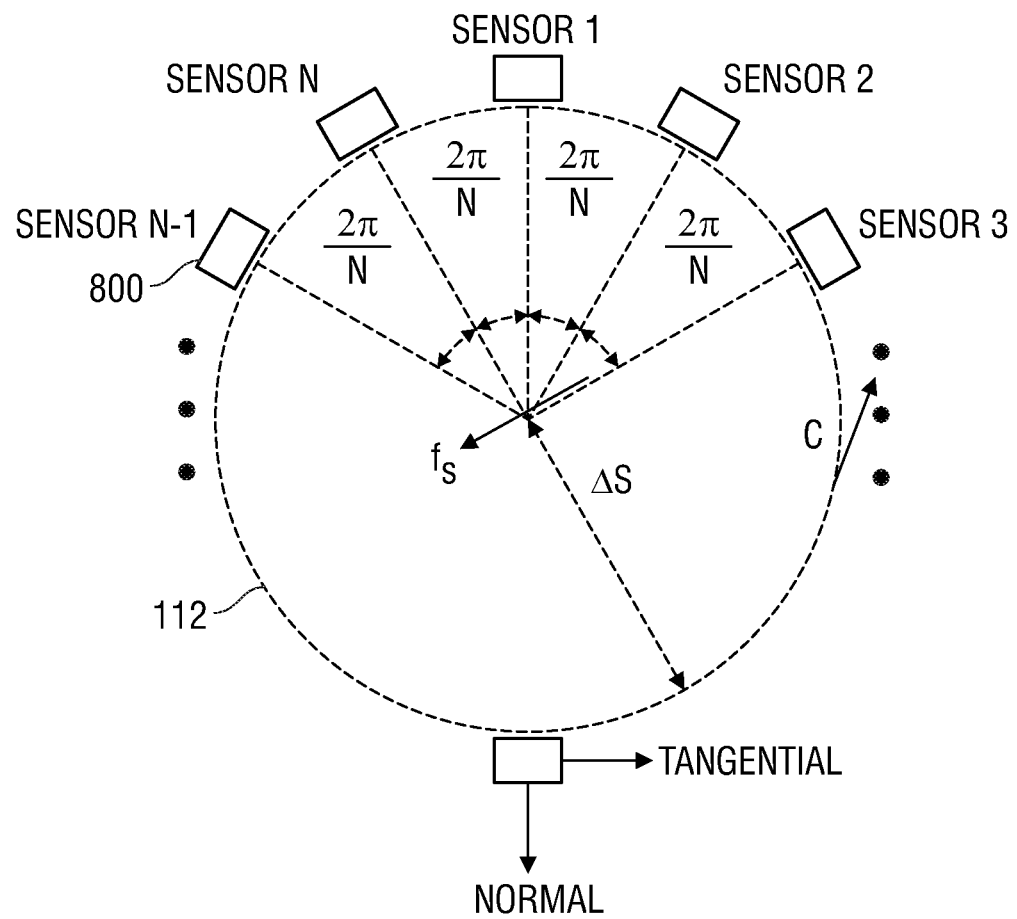
FIG. 8 illustrates still another sensor arrangement for use with the formation resistivity evaluation tool according to the disclosed embodiments.

Based on the above equation, it is possible to determine the current at different locations along the drill collar 112 by detecting or otherwise measuring (via the sensors 118) the magnetic field induced around the drill collar 112 at those locations. FIGS. 6-8 illustrate exemplary sensor configurations for detecting or otherwise measuring the magnetic field around the drill collar 112.

In the configuration of FIG. 6, a sensor 600 may be disposed on an outer surface of the drill collar 112 at a given location Z (corresponding to a given measured depth). The sensor 600 may be a magnetometer in some embodiments or it may be any type of sensor that is capable of detecting a magnetic field. To protect it from harsh downhole conditions, it may be desirable to place a protective cover (not expressly shown) over the sensor 600 in some embodiments, and/or locate the sensor 600 within a recessed area on the drill collar 112. A nonconductive isolation pad 602 may be disposed between the sensor 600 and the outer surface of the drill collar 112 to electrically insulate the sensor from the drill collar 112 in some embodiments. The current signal amplitude at the given location on the drill collar 112 may then be obtained as follows:

$$I = (2\pi\Delta S) \times (\vec{H} \cdot \hat{\Phi}) \qquad (4)$$

where I is the current signal amplitude at the given location Z on the drill collar 112, $\Delta S$ is the distance between the center of the sensor 600 and the center of the drill collar 112, and $\vec{H}$ is the magnetic field measured or otherwise detected by the sensor 600. Note that the sensor 600 may be oriented at any angle on the drill collar 112 provided the orientation is not perpendicular to the direction 43 (i.e., azimuthal direction) of the magnetic field around the drill collar 112.

In the configuration of FIG. 7, two nearly identical sensors, a first sensor 700 and a second sensor 702, may be disposed on an outer surface of the drill collar 112 directly opposite one another at the given location Z for improved accuracy. A first isolation pad 704 and a second isolation pad 706 may be disposed between the drill collar 112 and the first and second sensors 700 and 702, respectively, for electrical insulation in some embodiments. The readings from the second sensor 702 may then be constructively combined (e.g., added, weighted averaged, etc.) with the readings from the first sensor 700 as needed.

As mentioned earlier, in actual ranging operations, current flows both into and out of the drilling well 102 and into and out of the target well 101. It is therefore important in the configuration of FIG. 7 not to destructively combine (e.g., subtract, etc.) the readings of the first sensor 700 from those of the second sensor 702, as the results may represent the current signal in the target well 101 and not the drilling well 102.

In the configuration of FIG. 8, instead of a pair of sensors disposed directly opposite one another at a given location on the drill collar 112, a series of N (e.g., 16) nearly identical sensors, one of which is labeled 800, may be disposed azimuthally around the drill collar 112 substantially equidistant from one another. In this arrangement, each sensor 800 detects a normal component and a tangential component of the magnetic field H at a given location along the drill collar 112. The current signal amplitude at the given location on the drill collar 112 may then be obtained as the sum of all the magnetic fields detected by the N sensors:

$$I_z = \oint_C \vec{H} d\vec{r} \approx \sum_{i=1}^{N} H_{tangential}(i) \times (2\pi \Delta S) \times \frac{2\pi}{N} \qquad (5)$$

Figure 9:
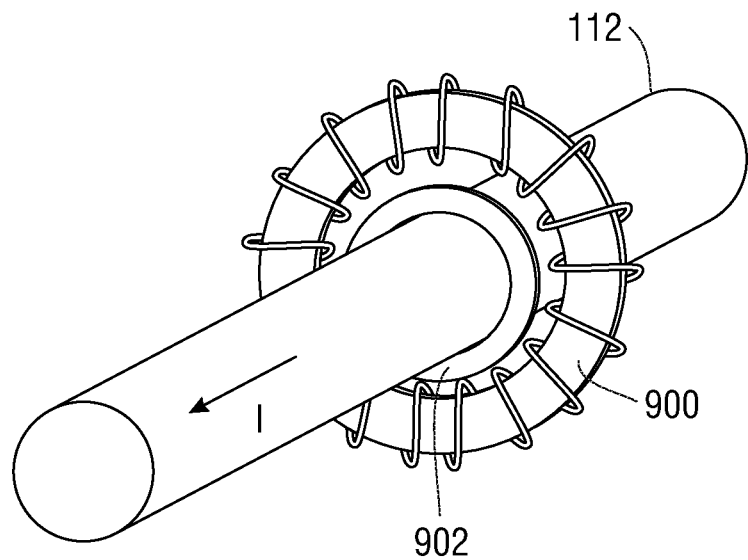
FIG. 9 illustrates yet another sensor arrangement for use with the formation resistivity evaluation tool according to the disclosed embodiments.

FIG. 9 illustrates an embodiment where the current signal amplitude at a given location on the drill collar 112 may be detected using a current sensor 900. The current sensor may include a toroid transformer 900 disposed around the drill collar 112 and an isolation ring 902 may be placed between the toroid transformer 900 and the drill collar 112 for electrical insulation. Such a toroid transformer 900 may then be used to detect the current signal by measuring the current induced in the toroid transformer by the current signal, as shown by Equations (6) and (7):

$$B_{current} = \frac{\mu N I_{Toroid}}{2\pi L} \qquad (6)$$

$$I_z = \oint_C \vec{H} d\vec{r} = \frac{B_{current}}{\mu} \times 2\pi L = N I_{Toroid} \qquad (7)$$

In the above equations, H is again the magnetic field, $B_{current}$ is the current signal, $I_{Toroid}$ is current induced in the toroid transformer by the current signal, N is the number of turns of coils around the toroid transformer, $\mu$ is the permeability constant of the toroid transformer, and L is the radius of the toroid transformer.

Figure 10:
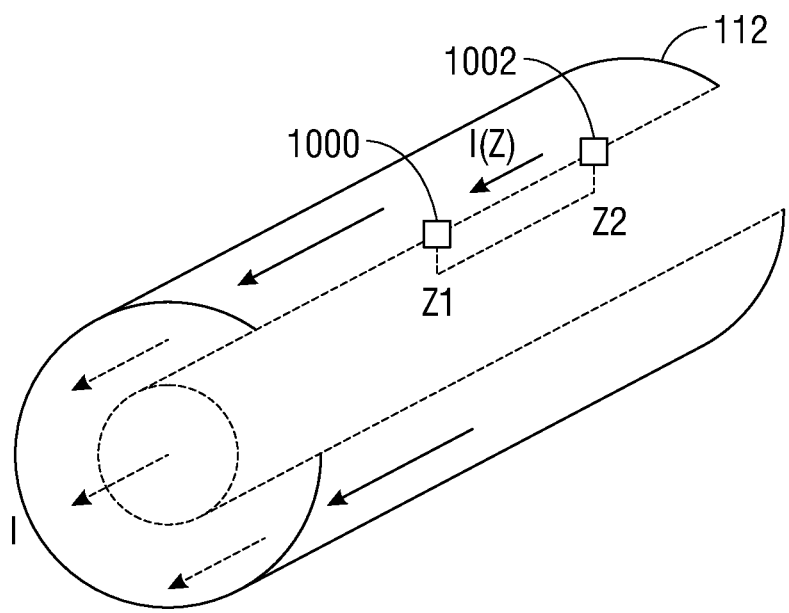
FIG. 10 illustrates still another sensor arrangement for use with the formation resistivity evaluation tool according to the disclosed embodiments.

FIG. 10 illustrates an embodiment where the current signal amplitude at a given location on the drill collar 102 may be detected using two voltage sensors, a first voltage sensor 1000 and a second voltage sensor 1002, to detect the voltage potential between a first given location Z1 and a second given location Z2 on the drill collar 102. Such voltage sensors 1000 and 1002 may include voltage transducers or similar types of sensors that are capable of detecting very low AC voltage potential. As shown in FIG. 10, the voltage sensors 1000 and 1002 may be physically connected to the drill collar 102 either on the inner or outer surface of the drill collar 102 for optimum effectiveness. The current signal amplitude at a location in between the voltage sensors 1000 and 1002 may then be calculated by Equation (8):

$$I(z) = \frac{V1 - V2}{Rpipe} \quad (8)$$

In the above equation, Z is the measured depth at a middle point between the two voltage sensors 1000 and 1002 on the drill collar 112, I(z) is the current at that point, and V1 and V2 are the voltages detected by the sensors, respectively. Multiple set of sensors 1000 and 1002 may then be disposed azimuthally around the drill collar 112 in some embodiments to determine the voltage potential on the drill collar 112 and hence the current signal amplitude on the drill collar 112.

In general, any of the foregoing sensor configurations in FIGS. 6-10 may be used to measure or detect a current signal amplitude along a section of the drilling well 102. The timing and number of readings obtained with the sensors may vary depending on whether the excitation source (e.g., power supply 121) is stationary with respect to the sensors. For example, where the excitation source is connected to the wellhead and thus does not move with the drill collar 112, two or more readings need to be taken with the same sensors at two or more times and two or more measured depths in order to obtain a current distribution. Thus, a first reading is obtained at a first depth Z1 with the sensors, the drill collar 112 is moved along the wellbore 114, then a second reading is taken at a second depth Z1 with the same sensors.

In other embodiments, the excitation source may be connected to the drill string 104, for example, to the drill collar 112 or other components of the BHA 108, and thus moves with the sensors. In these embodiments, two or more readings need to be taken at the same time with the two or more sensors located at two or more measured depths in order to obtain a current distribution. Thus, a first reading is taken with a first sensor located at a first location on the drill collar 112 corresponding to a first depth Z1, and at the same time a second reading is taken with a second sensor located at a second location on the drill collar 112 corresponding to a second depth Z2. An exemplary sensor arrangement that may be used in these embodiments is shown in FIG. 11.

Figure 11:
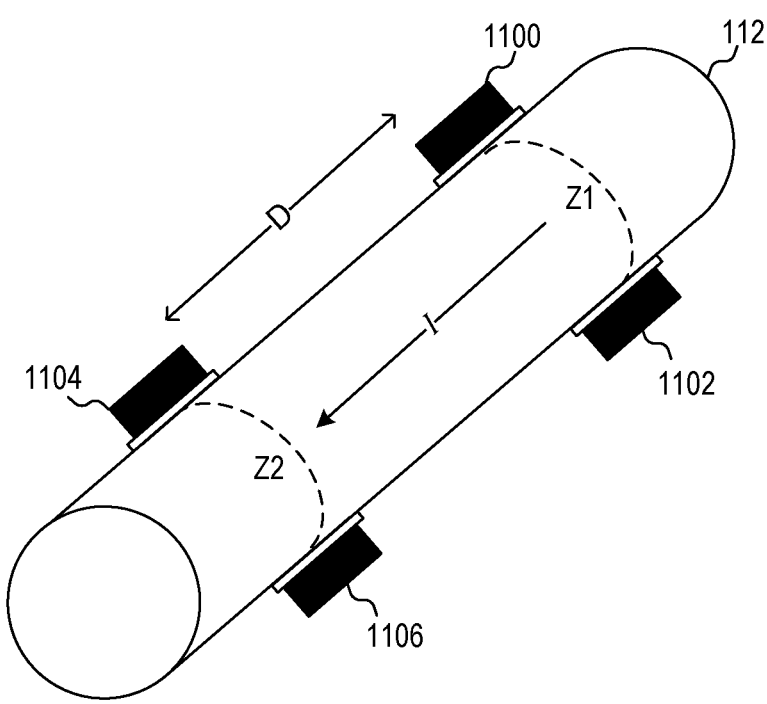
FIG. 11 illustrates yet another sensor arrangement for use with the formation resistivity evaluation tool according to the disclosed embodiments.

Referring to FIG. 11, two or more pairs of nearly identical sensors, including a first pair of sensors 1100 & 1102 and a second pair of sensors 1104 & 1106, are disposed lengthwise on the drill collar 112 (i.e., in a direction parallel to the wellbore 114) spaced apart by a distance D. The first pair of sensors 1100 & 1102 may be disposed at a first location Z1 on the drill collar 112 (corresponding to a first measured depth) and the second pair of sensors 1104 & 1106 may be disposed at a second location Z2 on the drill collar 112 (corresponding to a different measured depth). The first pair of sensors 1100 & 1102 and the second pair of sensors 1104 & 1106 are preferably, but not necessarily, aligned with each other along a length of the drill collar 112. For optimal effectiveness, the distance D may be between about 4 feet and about 20 feet.

To obtain a current distribution, each pair of sensors 1100 & 1102 and 1104 & 1106 at each location Z1 and Z2 may be used to simultaneously measure or otherwise detect an amplitude of a current signal I along the drill collar 112. The amplitudes detected by the pair of sensors 1100 & 1102 may then be combined (e.g., averaged) to produce a current signal amplitude at the first location Z1, and the amplitudes detected by the pair of sensors 1104 & 1106 may be similarly combined (e.g., averaged) to produce a current signal amplitude at the second location Z2. The resulting amplitudes at the locations Z1 and Z2 may then be set as the current distribution between locations Z1 and Z2. Such current distribution may then be used to determine a current leakage rate along the drill collar 112 at the measured depths corresponding to the locations Z1 and Z2 for determining formation resistivity. The current distribution may also be used to directly calculate the formation resistivity using Equation (2) in the manner described above.

Figure 12:
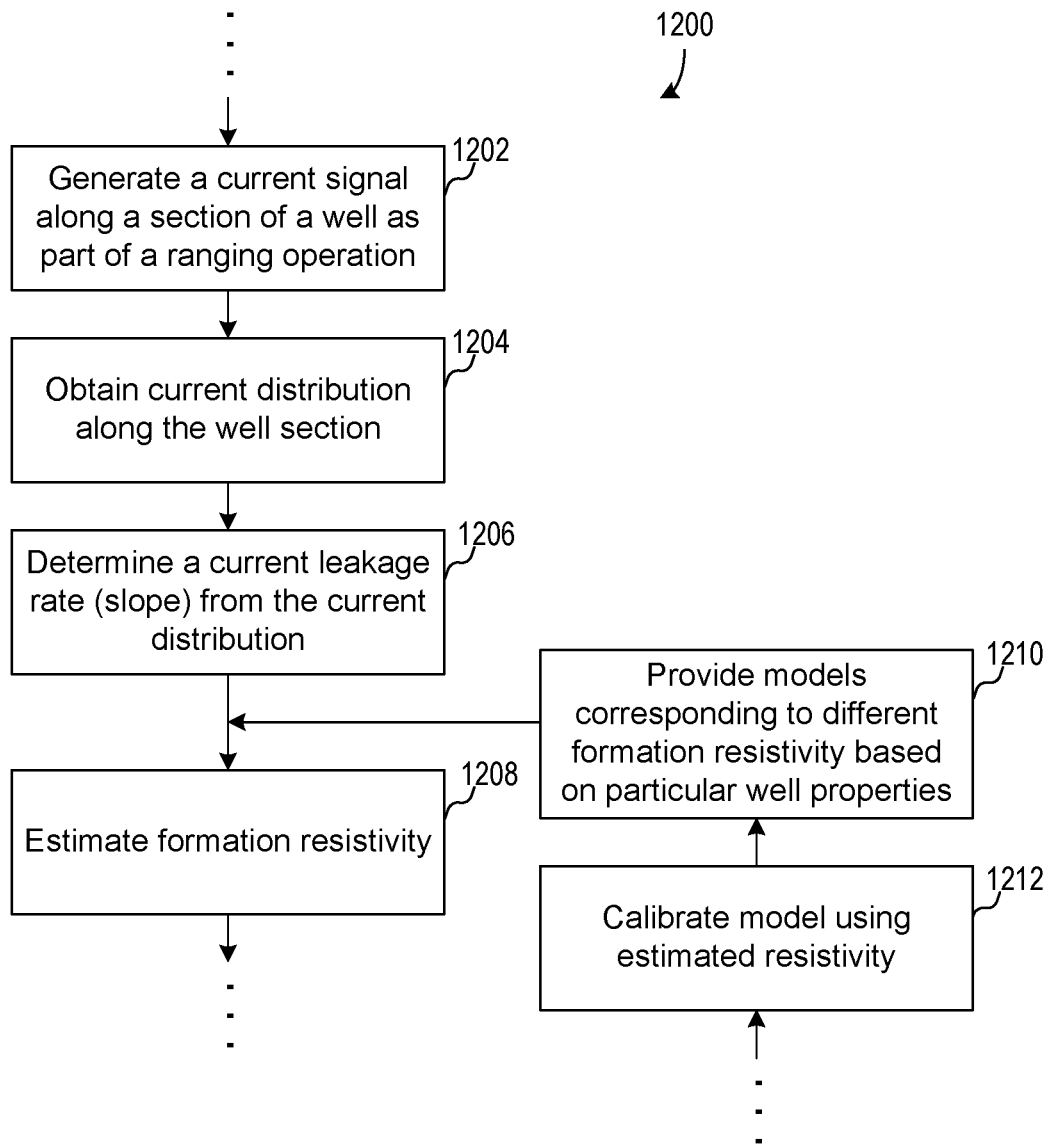
FIG. 12 illustrates an exemplary workflow that may be used with the formation resistivity evaluation tool according to the disclosed embodiments.

Thus far, a number of specific implementations of a formation resistivity evaluation tool that may be used have been described. Following now in FIG. 12 are general guidelines in the form of a flow chart 1200, or portion thereof, outlining a method that may be used to implement the formation resistivity evaluation tool in conjunction with a ranging operation. Those having ordinary skill in the art will understand of course that alternative arrangements may be derived from the teachings presented herein without departing from the scope of the disclosed embodiments.

As can be seen in FIG. 12, the workflow 1200, or portion thereof, begins at block 1202 where a low-frequency or sometimes DC current signal is provided along a section of a drilling well, such as a drill collar or other components of a BHA, a segment of a drill string, and the like. The current signal is preferably provided as part of a ranging operation, but it is also possible to provide the current signal independently of the ranging operation. Next, at block 1204, a current distribution is obtained for the section of the drilling well by measuring or detecting and compiling current signal amplitudes along the drilling well section. Again, the current signal amplitudes are preferably compiled as part of a ranging operation, but they may also be compiled independently of the ranging operation. From the current distribution, a current leakage rate may be determined using an appropriate slope equation at block 1206 (e.g., Equation (1)). A leakage rate curve may then be used at block 1208 to estimate the formation resistivity surrounding the drilling well through curve matching as described above. Alternatively, the formation resistivity may be calculated at block 1208 using the current distribution along the section of the drilling well (e.g., Equation (2)). Multiple such calculations may then be obtained at various measured depths along the wellbore to determine the formation resistivity around the drilling well.

In some embodiments, modeled or known leakage rate curves corresponding to different formation resistivity may be provided at block 1210 to facilitate curve matching. As well, in some embodiments the estimated/calculated resistivity may be used to further calibrate any models at block 1212, for example, via an inversion process where predicted data is compared to observed data to determine the validity of the model.

Accordingly, as set forth above, the embodiments disclosed herein may be implemented in a number of ways. For example, in general, in one aspect, the disclosed embodiments relate to a ranging and resistivity evaluation system. The system comprises, among other things, a power source coupled to provide a current signal on a conductive material in a wellbore as part of a ranging operation and at least one sensor disposed on the conductive material in the wellbore and configured to detect the current signal. The system further comprises a formation evaluation system coupled to receive sensor data representing the current signal from the at least one sensor and a formation resistivity evaluation tool residing in the formation evaluation system. The formation resistivity evaluation tool is operable to obtain a current distribution along the conductive material from the sensor data and calculate a resistivity of the formation from the current distribution.

In general, in another aspect, the disclosed embodiments relate to a method of evaluating a resistivity of a formation in conjunction with a ranging operation. The method comprises, among other things, the steps of providing a current signal on a conductive material in a wellbore as part of the ranging operation and detecting the current signal by at least one sensor disposed on the conductive material in the wellbore. The method further comprises receiving sensor data representing the current signal from the at least one sensor, obtaining a current distribution along the conductive material from the sensor data, and calculating a resistivity of the formation from the current distribution.

In general, in yet another aspect, the disclosed embodiments relate to a computer-readable medium storing computer-readable instructions for evaluating a resistivity of a formation surrounding a wellbore. The computer-readable instructions cause a computing system to, among other things, detect a current signal by at least one sensor disposed on a conductive material in the wellbore, the current signal being provided on the conductive material in the wellbore as part of a ranging operation. The computer-readable instructions further cause the computing system to receive sensor data representing the current signal from the at least one sensor, obtain a current distribution along the conductive material from the sensor data, and calculate a resistivity of the formation from the current distribution.

In accordance with any of the foregoing embodiments, a current leakage rate may be determined from the current distribution.

In accordance with any of the foregoing embodiments, the resistivity of the formation may be estimated from the current leakage rate.

In accordance with any of the foregoing embodiments, at least one modeled current leakage rate may be provided corresponding to at least one known formation resistivity for comparison to the estimated resistivity.

In accordance with any of the foregoing embodiments, the at least one modeled current leakage rate may be calibrated using the estimated resistivity.

In accordance with any of the foregoing embodiments, the at least one sensor is one of: a magnetometer, a toroid transformer, and a voltage sensor.

In accordance with any of the foregoing embodiments, the conductive material is one of: a component of a bottom hole assembly in the wellbore, and a segment of a drill string in the wellbore.

In accordance with any of the foregoing embodiments, the component of the bottom hole assembly is a drill collar.

In accordance with any of the foregoing embodiments, the at least one sensor comprises multiple sensors arranged according to one of: azimuthally around the conductive material, and lengthwise along the conductive material.

While the invention has been described with reference to one or more particular embodiments, those skilled in the art will recognize that many changes may be made thereto without departing from the spirit and scope of the description. Each of these embodiments and obvious variations thereof is contemplated as falling within the spirit and scope of the claimed invention, which is set forth in the following claims.

What is claimed is:

1. A ranging and resistivity evaluation system, comprising:
   a power source coupled to provide a current signal on a conductive material in a wellbore as part of a ranging operation, the current signal having a low frequency that is usable to perform the ranging operation;
   at least one sensor disposed on the conductive material in the wellbore and configured to detect the current signal as part of the ranging operation;
   a formation evaluation system coupled to receive sensor data representing the current signal from the at least one sensor as part of the ranging operation; and
   a formation resistivity evaluation tool residing in the formation evaluation system, the formation resistivity evaluation tool operable to derive current distribution data and obtain a current distribution along the conductive material from the sensor data received as part of the ranging operation and calculate a resistivity of the formation from the current distribution.

2. The system of claim 1, wherein the formation resistivity evaluation tool is further operable to determine a current leakage rate from the current distribution using a difference in an amplitude of the current signal at different measured depths, said amplitude detected using the at least one sensor, and a difference in the different measured depths.

3. The system of claim 2, wherein the formation resistivity evaluation tool is further operable to estimate the resistivity of the formation from the current leakage rate.

4. The system of claim 3, wherein the formation resistivity evaluation tool is further operable to provide at least one modeled current leakage rate corresponding to at least one known formation resistivity for comparison to the estimated resistivity.

5. The system of claim 4, wherein the formation resistivity evaluation tool is further operable to calibrate the at least one modeled current leakage rate using the estimated resistivity.

6. The system of claim 1, wherein the at least one sensor is one of: a magnetometer, a toroid transformer, or a voltage sensor.

7. The system of claim 1, wherein the conductive material is one of: a component of a bottom hole assembly in the wellbore, or a segment of a drill string in the wellbore.

8. The system of claim 7, wherein the component of the bottom hole assembly is a drill collar.

9. The system of claim 1, wherein the at least one sensor comprises multiple sensors arranged according to one of: azimuthally around the conductive material, or lengthwise along the conductive material.

10. A method of evaluating a resistivity of a formation in conjunction with a ranging operation, comprising:
    providing a current signal on a conductive material in a wellbore as part of the ranging operation, the current signal having a low frequency that is usable to perform the ranging operation;
    detecting the current signal by at least one sensor disposed on the conductive material in the wellbore as part of the ranging operation;
    receiving sensor data representing the current signal from the at least one sensor as part of the ranging operation;
    deriving current distribution data from the sensor data received as part of the ranging operation;

obtaining a current distribution along the conductive material from the current distribution data; and calculating a resistivity of the formation from the current distribution.

11. The method of claim 10, further comprising determining a current leakage rate from the current distribution using a difference in an amplitude of the current signal at different measured depths, said amplitude detected using the at least one sensor, and a difference in the different measured depths.

12. The method of claim 11, further comprising estimating the resistivity of the formation from the current leakage rate.

13. The method of claim 12, further comprising providing at least one modeled current leakage rate corresponding to at least one known formation resistivity for comparison to the estimated resistivity.

14. The method of claim 13, further comprising calibrating the at least one modeled current leakage rate using the estimated resistivity.

15. The method of claim 10, wherein the at least one sensor is one of: a magnetometer, a toroid transformer, or a voltage sensor.

16. The method of claim 10, wherein the conductive material is one of: a component of a bottom hole assembly in the wellbore, or a segment of a drill string in the wellbore.

17. The method of claim 16, wherein the component of the bottom hole assembly is a drill collar.

18. The method of claim 10, wherein the at least one sensor comprises multiple sensors arranged according to one of: azimuthally around the conductive material, or lengthwise along the conductive material.

19. A non-transitory computer-readable medium storing computer-readable instructions for evaluating a resistivity of a formation surrounding a wellbore, the computer-readable instructions causing a computing system to:

detect a current signal by at least one sensor disposed on a conductive material in the wellbore, the current signal being provided on the conductive material in the wellbore as part of a ranging operation and having a low frequency that is usable to perform the ranging operation;

receive sensor data representing the current signal from the at least one sensor as part of a ranging operation;

derive current distribution data from the sensor data received as part of the ranging operation;

obtain a current distribution along the conductive material from the current distribution data; and calculate a resistivity of the formation from the current distribution.

20. The computer-readable medium of claim 19, further comprising computer-readable instructions for causing the computing system to determine a current leakage rate from the current distribution using a difference in an amplitude of the current signal at different measured depths, said amplitude detected using the at least one sensor, and a difference in the different measured depths.

21. The computer-readable medium of claim 20, further comprising computer-readable instructions for causing the computing system to calculate the resistivity of the formation from the current leakage rate.

22. The computer-readable medium of claim 21, further comprising computer-readable instructions for causing the computing system to provide at least one modeled current leakage rate corresponding to at least one known formation resistivity for comparison to the estimated resistivity.

23. The computer-readable medium of claim 22, further comprising computer-readable instructions for causing the computing system to calibrate the at least one modeled current leakage rate using the estimated resistivity.

24. The computer-readable medium of claim 19, wherein the at least one sensor is one of: a magnetometer, a toroid transformer, or a voltage sensor.

25. The computer-readable medium of claim 19, further comprising a bottom hole assembly in the wellbore, wherein the conductive material is one of: a component of a bottom hole assembly in the wellbore, or a segment of a drill string in the wellbore.

26. The computer-readable medium of claim 25, wherein the component of the bottom hole assembly is a drill collar.

27. The computer-readable medium of claim 19, wherein the at least one sensor comprises multiple sensors arranged according to one of: azimuthally around the conductive material, or lengthwise along the conductive material.

* * * * *